(12) United States Patent
Ge

(10) Patent No.: US 11,977,749 B2
(45) Date of Patent: May 7, 2024

(54) ALIGNMENT OF ACTIVATION PERIODS

(71) Applicant: Micron Technology, Inc., Boise, ID (US)

(72) Inventor: Liang Ge, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 79 days.

(21) Appl. No.: 17/708,627

(22) Filed: Mar. 30, 2022

(65) Prior Publication Data

US 2023/0315307 A1    Oct. 5, 2023

(51) Int. Cl.
*G06F 3/06* (2006.01)
(52) U.S. Cl.
CPC .......... *G06F 3/0625* (2013.01); *G06F 3/0655* (2013.01); *G06F 3/0679* (2013.01)
(58) Field of Classification Search
CPC .... G06F 3/0625; G06F 3/0679; G06F 3/1221; G06F 3/0655
USPC ................................................. 711/154, 103
See application file for complete search history.

(56) References Cited

U.S. PATENT DOCUMENTS

| | | | |
|---|---|---|---|
| 2020/0201417 A1* | 6/2020 | Park | G06F 1/3275 |
| 2020/0241776 A1* | 7/2020 | Chen | G06F 11/3034 |
| 2020/0279611 A1* | 9/2020 | Reusswig | G11C 7/20 |

\* cited by examiner

*Primary Examiner* — Hashem Farrokh
(74) *Attorney, Agent, or Firm* — Holland & Hart LLP

(57) ABSTRACT

Methods, systems, and devices for alignment of activation periods are described. Techniques for memory operations are described. A device may transition from a reduced-power state to a reception-ready state based on a timing parameter of the device that indicates a first duration for transitioning the device from the reduced-power state to the reception-ready state. After transitioning to the reception-ready state, a data transmission may be received beginning at a first time. A second time associated with an error in the data transmission may be determined. The timing parameter may be configured to indicate a second duration for transitioning the device to the reception-ready state based on a difference between the second time and the first time.

25 Claims, 6 Drawing Sheets

ALIGNMENT OF ACTIVATION PERIODS

FIELD OF TECHNOLOGY

The following relates to one or more systems for memory, including alignment of activation periods.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

As part of a memory system exiting a reduced-power state, a host system may enable a transmitter and begin a first data transmission to the memory system. The host system may also enable a receiver. In some examples, the host system enables the receiver while the first data transmission is ongoing—e.g., due to delays between enabling the transmitter and enabling the receiver at the host system. In some examples, enabling receive circuitry while data signaling is being transmitted to the memory system interferes with the data signaling. The interference from enabling receive circuitry may cause one or more errors in the data signaling for some host system/memory system pairs, but not others. In some examples, the erroneous data signaling may be retransmitted, which may reduce a data rate for communications.

To identify systems where activating receive circuitry at a transmitting system (e.g., a host system) causes errors in data signaling when a reduced-power state is exited, a receiving system (e.g., a memory system) may be configured to detect errors in signaling that occurs within a threshold duration of the reduced-power state being exited. Also, to mitigate error-causing interference resulting from activating receive circuitry, techniques may be used to align a time at which the receive circuitry is enabled with a time at which data signaling begins. To align the times at which the receive circuitry is enabled and a time at which data signaling begins, a delay between enabling the transmit circuitry and the receive circuitry may be determined (e.g., based on a time at which the error is detected) and timing parameters observed by a memory system for returning to an operating state may be updated.

Features of the disclosure are initially described in the context of systems and devices. Features of the disclosure are also described in the context of signal diagrams and a process flow. These and other features of the disclosure are further illustrated by and described in the context of an apparatus diagram and flowchart that relate to alignment of activation periods.

Figure 1:
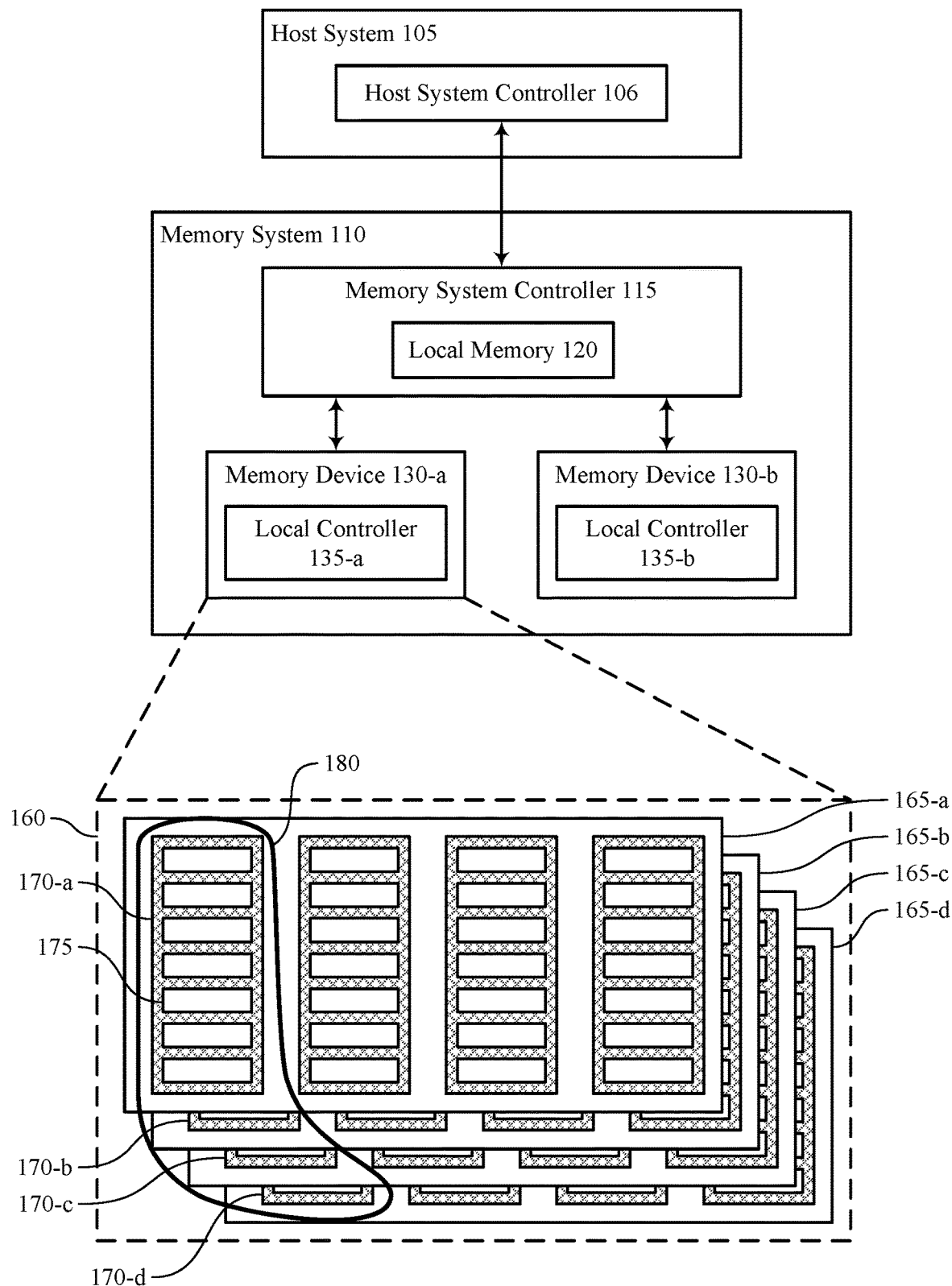
FIG. 1 illustrates an example of a system that supports alignment of activation periods in accordance with examples as disclosed herein.

FIG. 1 illustrates an example of a system 100 that supports alignment of activation periods in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support alignment of activation periods. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory system 110 may transition from a reduced-power state to a reception-ready state based on a timing parameter of the memory system 110 that indicates a first duration for transitioning the memory system 110 from the reduced-power state to the reception-ready state. After transitioning to the reception-ready state, the memory system 110 may receive a data transmission beginning at a first time. The memory system 110 may determine a second time associated with an error in the data transmission. The memory system 110 may also configure the timing parameter to indicate a second duration for transitioning the memory system 110 to the reception-ready state based on a difference between the second time and the first time.

Figure 2:
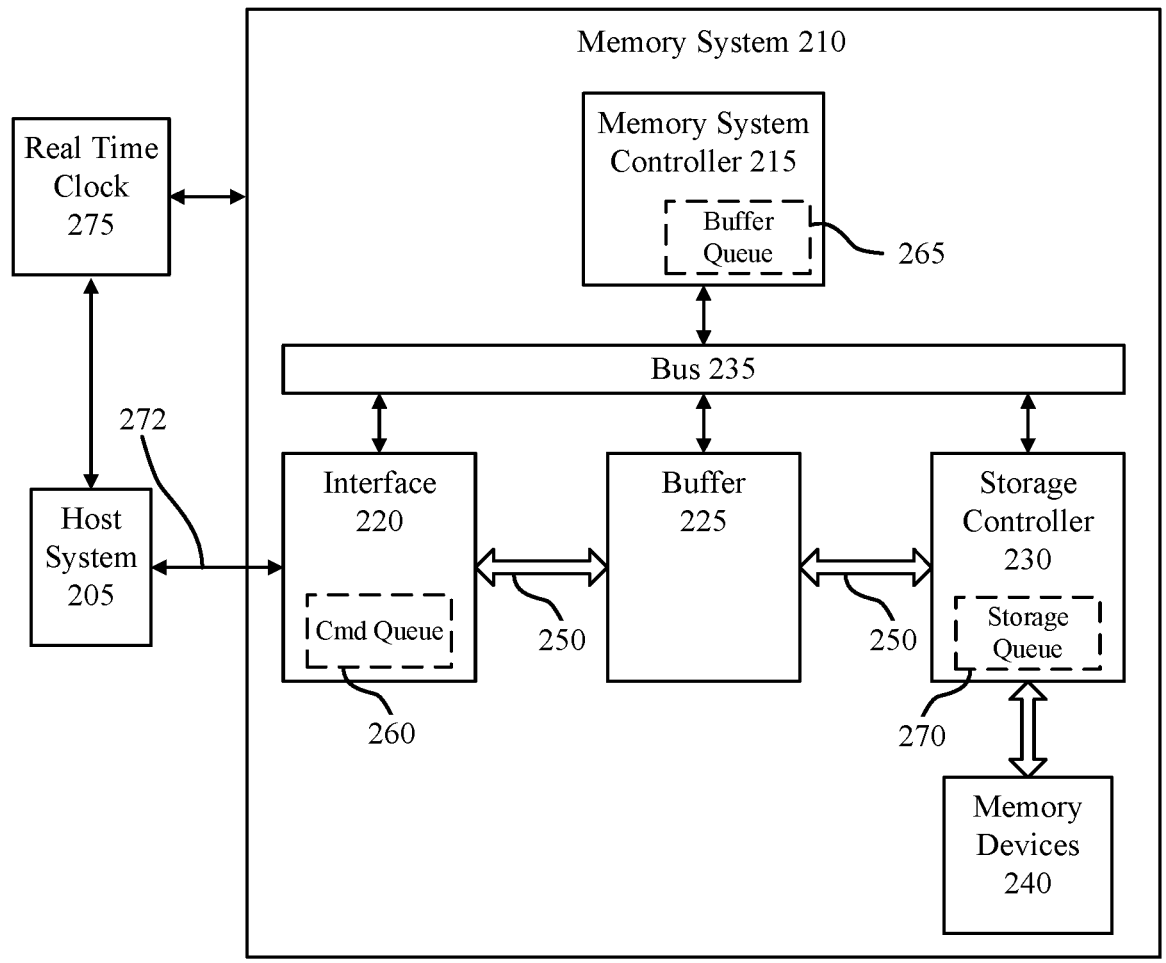
FIG. 2 illustrates an example of a system that supports alignment of activation periods in accordance with examples as disclosed herein.

FIG. 2 illustrates an example of a system 200 that supports alignment of activation periods in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The system 200 may include a real time clock 275. A real time clock 275 may be configured to maintain a clock regardless of a state of the system 200. In some examples, the real time clock 275 maintains an absolute time—e.g., based on a centralized, atomic clock. In other examples, the real time clock 275 maintains a relative time—e.g., based on a timing reference maintained at the host system 205 or the memory system 210. The real time clock 275 may be connected to an uninterruptible power source (e.g., a battery). The real time clock 275 may be located within the host system 205 or the memory system 210. Both the host system 205 and the memory system 210 may each include synchronized versions of the real time clock 275.

A host system 205 may communicate with a memory system 210 via a connection 272. In some examples, connection 272 includes multiple communication paths. For example, connection 272 may include a first communication path between host system 205 and memory system 210 over which host system 205 may transmit data signaling to memory system 210. And a second communication path between host system 205 and memory system 210 over which memory system 210 may transmit data signaling to host system 205. Each of the communication paths may include differential signaling, and may include one or more lanes (e.g., differential signaling pairs).

A memory system 210 may be capable of entering a reduced-power state (which may be referred to as a hibernation state) to save power. While in the reduced-power state, components within the memory system 210 may be turned off or operated in a reduced-power mode. In some examples, the memory system 210 may be unable to receive or transmit certain signaling from or to the host system 205 (e.g., data signaling, access command signaling, etc.)—e.g., based on configuring transmit circuitry and receive circuitry in a reduced-power state. Among other mechanisms, the memory system 210 may enter the reduced-power state after detecting that a connection between the memory system 210 and the host system 205 has remained idle for a threshold duration, based on receiving a command from the host system 205 to enter the reduced-power state, or both. The memory system 210 may indicate to the host system 205 when the memory system has successfully entered the reduced-power state.

A host system 205 may similarly enter a reduced-power state—e.g., when a memory system 210 enters a reduced-power state. While in the reduced-power state, components within the host system 205 may be turned off or operated in a reduced-power mode. In some examples, the host system 205 may be unable to receive or transmit certain signaling from or to the memory system 210 (e.g., data signaling, access command signaling, etc.)—e.g., based on configuring transmit circuitry and receive circuitry in a reduced-power state. Also, The host system 205 may include a real time clock (RTC) that is continuously used to keep track of time regardless of a state of the host system 205. In some examples, the real time clock is used to keep an absolute time—e.g., a time that is synchronized to a centralized, atomic clock. In other examples, the real time clock is used to keep a relative time—e.g., a time that is synchronized relative to a clock of a component coupled with the host system 205, such as a clock at memory system 210.

After entering the reduced-power state, the memory system 210 may eventually transition back to an operating state—e.g., in response to a signal received from the host system 205 used to wake up the memory system 210. In some examples, returning to the operating state includes exiting a hibernation state, entering a reception-ready state, a transmission-ready state, or any combination thereof. Accordingly, the memory system 210 may return to the operating state within a duration. In some examples, the duration is based on a capability of or setting of the memory system 210. The memory system 210 may indicate to the host system 205 a timing parameter that indicates the duration for returning to the operating state. In some examples, the memory system indicates multiple timing parameters to the host system 205, including a timing parameter that indicates a duration for exiting the hibernation state (e.g., which may be referred to as $T_{hib}$); a timing parameter that indicates a duration for returning to the reception-ready state (e.g., which may be referred to as $T_{act\_1}$); and a timing parameter that indicates a duration for returning to the transmission-ready state (e.g., which may be referred to as $T_{act\_2}$).

When the memory system 210 exits the reduced-power state, the host system 205 may observe the durations indicated by one or more receive timing parameters before exchanging signaling with the memory system 210. For example, the host system 205 may not transmit data signaling to the memory system 210 until a duration indicated by the memory system 210 for exiting the hibernation state and a duration indicated by the memory system 210 for entering the reception-ready state has elapsed. Also, the host system 205 may not receive data signaling from the memory system 210 until a duration indicated by the memory system 210 for exiting the hibernation state and a duration indicated by the memory system 210 for entering the transmission-ready state has elapsed.

In some examples, the host system 205 also exits a reduced-power state when the memory system 210 exits the reduced-power state. When exiting the reduced-power state, the host system 205 may similarly exit a hibernation state, enter a transmission-ready state (e.g., by enabling transmit circuitry), enter a reception-ready state (e.g., by enabling receive circuitry), or a combination thereof. In some examples, the host system 205 enters the reception-ready state after entering the transmission-ready state. For example, a time when receive circuitry at the host system 205 is enabled (e.g., turned on) may be delayed by a duration relative to a time when transmit circuitry at the host system 205 is enabled. The delay in enabling the receive circuitry may be based on a round trip time associated with host system 205 sending a command to wake up receive circuitry at memory system 210 and memory system 210 sending a command to wake up receive circuitry at host system 205. In some examples, the host system 205 may enable the receive circuitry after the host system 205 enables the transmit circuitry and while the host system 205 is transmitting data signaling to the memory system 210—e.g., via a first connection.

In some examples, enabling receive circuitry while data signaling is being transmitted to a memory system 210 interferes with the data signaling. The interference from enabling receive circuitry may cause one or more errors in the data signaling for some host system/memory system pairs but not others. In some examples, the erroneous data signaling may be retransmitted, which may reduce a data rate for communications between the host system 205 and the memory system 210.

To identify systems where activating receive circuitry at a transmitting system (e.g., a host system) causes errors in data signaling when a reduced-power state is exited, a receiving system (e.g., a memory system) may be configured to detect errors in signaling that occurs within a threshold duration of the reduced-power state being exited. Also, to mitigate error-causing interference resulting from activating receive circuitry, techniques may be used to align a time at which the receive circuitry is enabled with a time at which data signaling begins. To align the times at which the receive circuitry is enabled and a time at which data signaling begins, a delay between enabling the transmit circuitry and the receive circuitry may be determined (e.g., based on a time at which the error is detected) and timing parameters observed by a memory system for returning to an operating state may be updated.

In some examples, host system 205 and memory system 210 exit a reduced-power state. As part of exiting the reduced-power state, host system 205 may observe a combined duration including a hibernation duration (which may be referred to as $T_{hib}$) and a transmission-ready duration (which may be referred to as $T_{act\_1}$)—which may correspond to a reception-ready duration for the memory system 210. At the end of the combined duration and at a first time, the host system 205 may activate transmit circuitry and transmit data signaling to memory system 210. In some examples, one or both of the host system 205 and the memory system 210 may record the first time—e.g., by generating a first timestamp synchronized to a real time clock 275. The host system 205 may transmit the first timestamp to the memory system 210.

Similarly, as part of exiting the reduced-power state, host system 205 may observe a second combined duration including the hibernation duration and a reception-ready duration (which may be referred to as $T_{act\_2}$)—which may correspond to a transmission-ready duration for the memory system 210. At the end of the second combined duration and at a second time, the host system 205 may activate receive circuitry. In some examples, the host system 205 may record the second time—e.g., by generating a second timestamp synchronized to the real time clock 275. The host system 205 may transmit the second timestamp to the memory system 210.

While receiving the data signaling from the host system 205, the memory system 210 may perform error management operations. In some examples, the memory system 210 detects an error in the data signaling. The memory system 210 may determine that the error occurred at a third time (e.g., by determining a time at which the associated data was received) that occurs within a threshold duration of exiting the reduced-power state. In some examples, as part of exiting the reduced-power state, the memory system 210 may record the third time—e.g., by generating a third timestamp synchronized to the real time clock 275.

The memory system 210 may adjust a timing parameter for entering a reception-ready state based on the generated timestamps. In some examples, the memory system adjusts the timing parameter for entering the reception-ready state to indicate a new reception-ready duration that is increased (relative to the prior reception-ready duration) by a duration between the third timestamp and the first timestamp. Accordingly, the beginning of subsequent data signaling performed after exiting a reduced-power state may be aligned with an activation of receive circuitry at the host system 205, mitigating the effect of the interference caused by activating the receive circuitry. The memory system 210 may use the second timestamp to determine whether the error that triggered the generation of the third timestamp is associated with enabling receive circuitry at the host system 205. For example, the memory system 210 may determine that the error is associated with the receive circuitry at the host system 205 being enabled based on a difference between the third timestamp and the second timestamp being less than a threshold duration (e.g., within tens of milliseconds).

Figure 3:
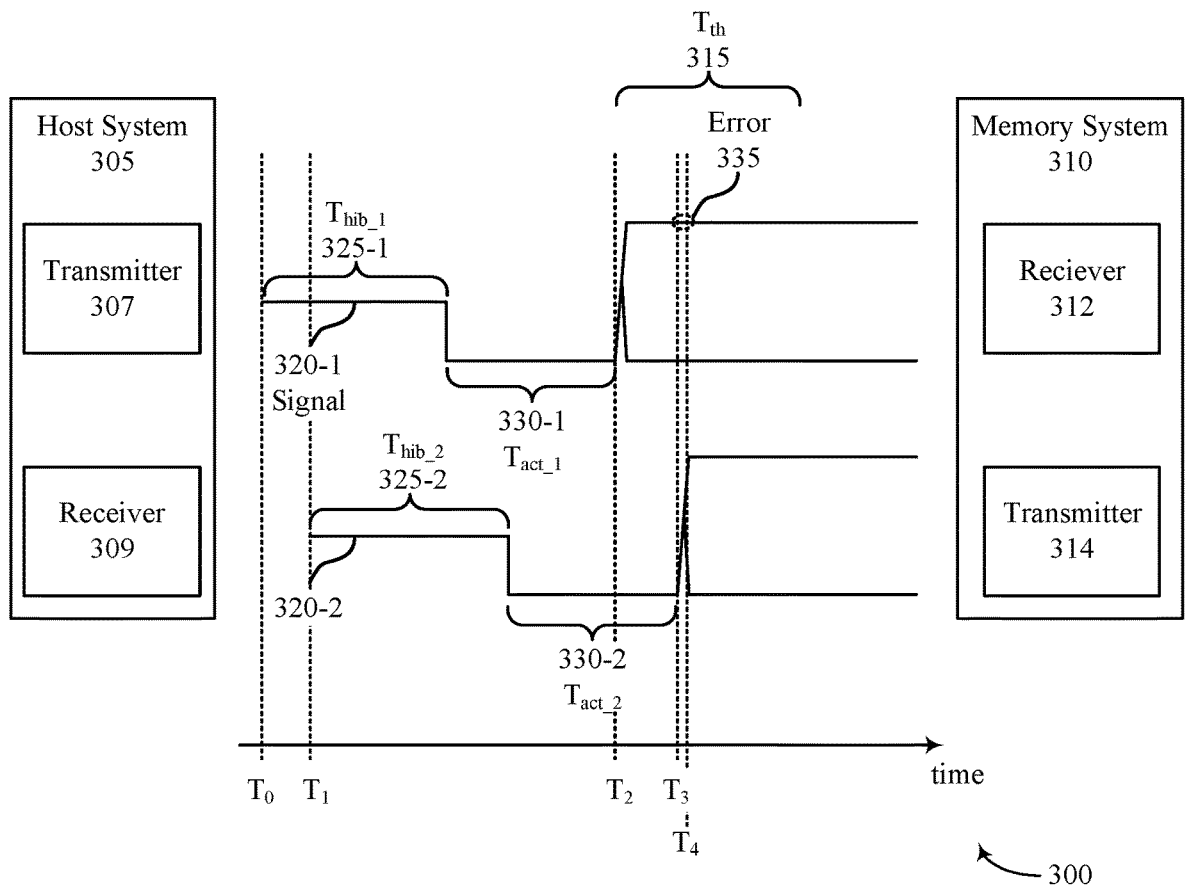
FIG. 3 illustrates an example of signal diagrams for alignment of activation periods in accordance with examples as disclosed herein.
Figure 3:
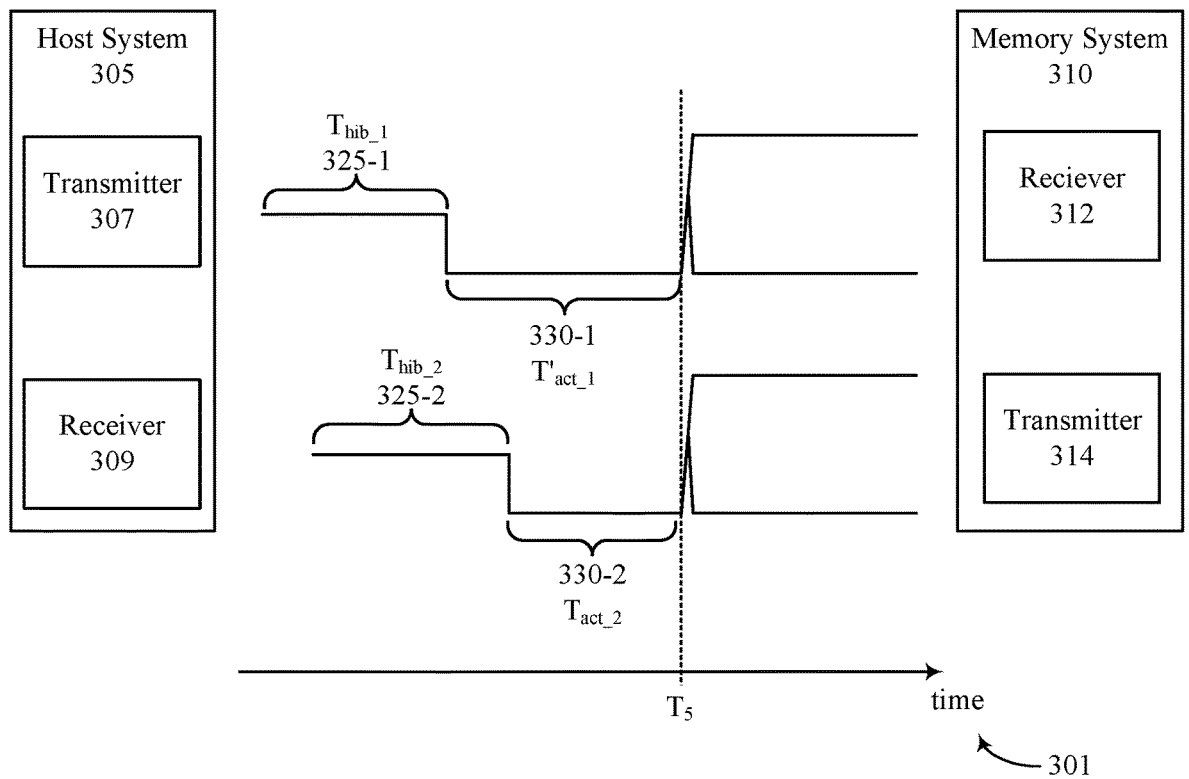

FIG. 3 illustrates an example of signal diagrams for alignment of activation periods in accordance with examples as disclosed herein.

First signal diagram 300 depicts a first instance of signal transmission between host system 305 and memory system 310 upon exiting a reduced-power state. Second signal diagram 301 depicts a following instance of signal transmission between host system 305 and memory system 310 upon exiting a reduced-power state for a second time and after measures have been implemented to align transmissions to memory system 310 with transmissions to host system 305. Host system 305 and memory system 310 may be respective examples of a host system and memory system described with reference to FIGS. 1 and 2.

As depicted by first signal diagram 300, one or both of host system 305 and memory system 310 may exit a reduced-power state—e.g., based on host system 305 obtaining data to be written to memory system 310. While in the reduced-power state, a first communication path between host system 305 and memory system 310 and associated with first signal 320-1 may be in a floating state. Also, a second communication path between host system 305 and memory system 310 and associated with second signal 320-2 may be in the floating state. While in the floating state, a voltage of a communication path may be indeterminate. While exiting the reduced-power state, host transmitter 307 may configure the first communication path to have a high differential impedance (which may be referred to as DIF_Z) for first hibernation duration 325-1—e.g. at time $T_0$. First hibernation duration 325-1 may be referred to as $T_{hib\_1}$. Similarly, memory system transmitter 314 may configure the second communication path to have the high differential impedance for second hibernation duration 325-2—e.g. at time $T_1$. Second hibernation duration 325-2 may be referred to as $T_{hib\_2}$. A length of second hibernation duration 325-2 may be equivalent to a length of first hibernation duration 325-1. In some examples, there may be a delay between the first communication path being configured with the high differential impedance and the second communication path being configured with the high differential impedance—the delay may be equivalent to $T_1$-$T_0$.

At an end of first hibernation duration 325-1, host transmitter 307 may drive the first communication path to a negative differential voltage (which may be referred to as DIF_N) for a first activation duration 330-1. First activation duration 330-1 may be referred to as $T_{act\_1}$. At an end of second hibernation duration 325-2, memory system transmitter 314 may drive the second communication path to a negative differential voltage (which may be referred to as DIF_N) for a second activation duration 330-2. Second activation duration 330-2 may be referred to as $T_{act\_2}$. A length of second activation duration 330-2 may be the same as or different than a length of first activation duration 330-1.

At an end of first activation duration 330-1 (at time $T_2$), host transmitter 307 may begin a data transmission to memory system 310. In some examples, host system 305 may record a timestamp of the beginning of the data transmission—e.g., based on a real time clock at host system 305. Additionally, or alternatively, memory system 310 may record a timestamp of the beginning of the data transmission—e.g., based on a real time clock at host system 305. At an end of second activation duration 330-2 (at time $T_3$), host receiver 309 may enter an enabled state, and memory system transmitter 314 may begin a second data transmission to host system 305. In some examples, host system 305 may record a timestamp of the beginning of the second data transmission—e.g., based on a real time clock at host system 305. Additionally, or alternatively, memory system 310 may record a timestamp of the beginning of the second data transmission—e.g., based on a real time clock at memory system 310.

In some examples, the durations of first hibernation duration 325-1, second hibernation duration 325-2, first activation duration 330-1, and second activation duration 330-2 may be indicated by timing parameters configured at memory system 310. For example, a value of a first timing parameter at configured for memory system 310 may indicate the duration of first hibernation duration 325-1 and second hibernation duration 325-2; a value of a second timing parameter configured for memory system 310 may indicate the duration of first activation duration 330-1, and a value of a third timing parameter configured for memory system 310 may indicate the duration of second activation duration 330-2.

Due to the delay between the beginning of first hibernation duration 325-1 and second hibernation duration 325-2, host receiver 309 may be enabled while host transmitter 307 is performing data transmission to memory system 310. In some examples, enabling (e.g., turning on) host receiver 309 causes interference to first signal 320-1 at a level sufficient to cause error 335 in a set of data being communicated in first signal 320-1 (at a time $T_4$). Memory system 310 may detect error 335 in a set of data carried by first signal 320-1 and received at memory device receiver 312—e.g., based on using error detection mechanisms, such as error correcting codes, cyclic redundancy checks, etc.

Based on detecting error 335, memory system 310 may determine and record a time at which error 335 occurred (e.g., within a range of time $T_4$)—e.g., based on determining a time at which a portion of the set of data including the error was received. In some examples, the recorded time is based on a real time clock at host system 305. Memory system 310 may further determine that the time at which error 335 occurred is within threshold duration 315 of an end of the first activation duration 330-1. Accordingly, memory system 310 may determine that error 335 was caused by the enabling of host receiver 309. In some examples, memory system 310 may confirm that error 335 was caused by the enabling of host receiver 309 based on a timestamp ($T_3$) received from host system 305 indicating a time at which host receiver 309 was enabled. Memory system 310 may confirm that error 335 was caused by enabling host receiver 309 based on determining that a difference between $T_4$ and $T_3$ is below a threshold duration (e.g., less than one millisecond). In some cases, memory system 310 requests the timestamp from host system 305 after detecting error 335. Memory system 310 may also request a timestamp ($T_2$) from host system 305 indicating a beginning of the data transmission received at memory system 310.

Based on detecting error 335 and determining that error 335 was caused by host receiver 309 being enabled, memory system 310 may adjust one or more timing parameters associated with exiting a hibernation state. In some examples, memory system 310 may adjust a value of a timing parameter used to indicate a length of an activation duration for a host transmitter 307. For example, memory system 310 may adjust the value of the timing parameter to indicate an updated length of the activation duration that is equivalent to the length of first activation duration 330-1 plus the difference between $T_4$ and $T_2$. In some examples, the difference between $T_4$ and $T_2$ is different than the difference between $T_1$ and $T_0$—e.g., based on differences between first activation duration 330-1 and second activation duration 330-2. Memory system 310 may indicate the updated timing parameter to host system 305—e.g., in response to a request from host system 305. In some examples, memory system 310 adds an offset (e.g., a positive offset) to the updated timing parameter to further increase the value of the timing parameter—e.g., to avoid underestimating the increase of first activation duration 330-1.

At a later time, host system 305 and memory system 310 may reenter the reduced-power state. In some examples, host system 305 requests the timing parameters associated with exiting a reduced-power state from memory system 310 before entering the reduced-power state.

As depicted by second signal diagram 301, one or both of host system 305 and memory system 310 may again exit a reduced-power state. As similarly described above, host transmitter 307 may observe first hibernation duration 325-1 and first activation duration 330-1. And host receiver 309 may observe second hibernation duration 325-2 and second activation duration 330-2. However, as depicted by second signal diagram 301, first activation duration 330-1 (which may be referred to as $T'_{act\_1}$) may be longer. The length of the longer version of first activation duration 330-1 may be based on the corresponding timing parameter previously updated by memory system 310. Based on the increased length of the first activation duration 330-1, a beginning of a data transmission to memory system 310 may be more closely aligned with the enabling of host receiver 309. Accordingly, the interference caused by turning on host receiver 309 may not cause an error in the data transmission to memory system 310. Based on receiving the data transmission from host system 305 without detecting an error caused by turning on host receiver 309, memory system 310 may maintain the timing parameters associated with exiting a reduced-power state.

In some examples, memory system 310 detects another error caused by turning on host receiver 309 even after adjusting the timing parameters associated with exiting the reduced-power state. In such cases, memory system 310 may repeat the operations described with reference to first signal diagram 300 to further adjust the timing parameters. Accordingly, the memory system may refine the alignment of the signal transmitted from host system 305 with the turning on of host receiver 309 through an iterative process.

As described herein, in examples where memory system 310 adds an offset (e.g., a positive offset) to the timing parameter for first activation duration 330-1, memory system 310 may incrementally reduce the value of the timing parameter during subsequent exits of the reduced-power state until an error caused by turning on host receiver 309 is detected. Memory system 310 may then revert the value of the timing parameter to the preceding value and use that value for subsequent exits from the reduced-power state.

In some examples, rather than computing the difference between time at which an error is detected and a beginning of a data transmission to host system 305 after a reduced-power is exited, memory system 310 may increase a value of the timing parameter for first activation duration 330-1 by a set amount. The set amount may be conservatively selected so that the data transmission to memory system 310 will occur after host receiver 309 is turned on. Memory system 310 may then incrementally reduce the value of the timing parameter during subsequent exits of the reduced-power state until an error caused by turning on host receiver 309 is detected. Memory system 310 may then revert the value of the timing parameter to the preceding value and use that value for subsequent exits from the reduced-power state.

Figure 4:
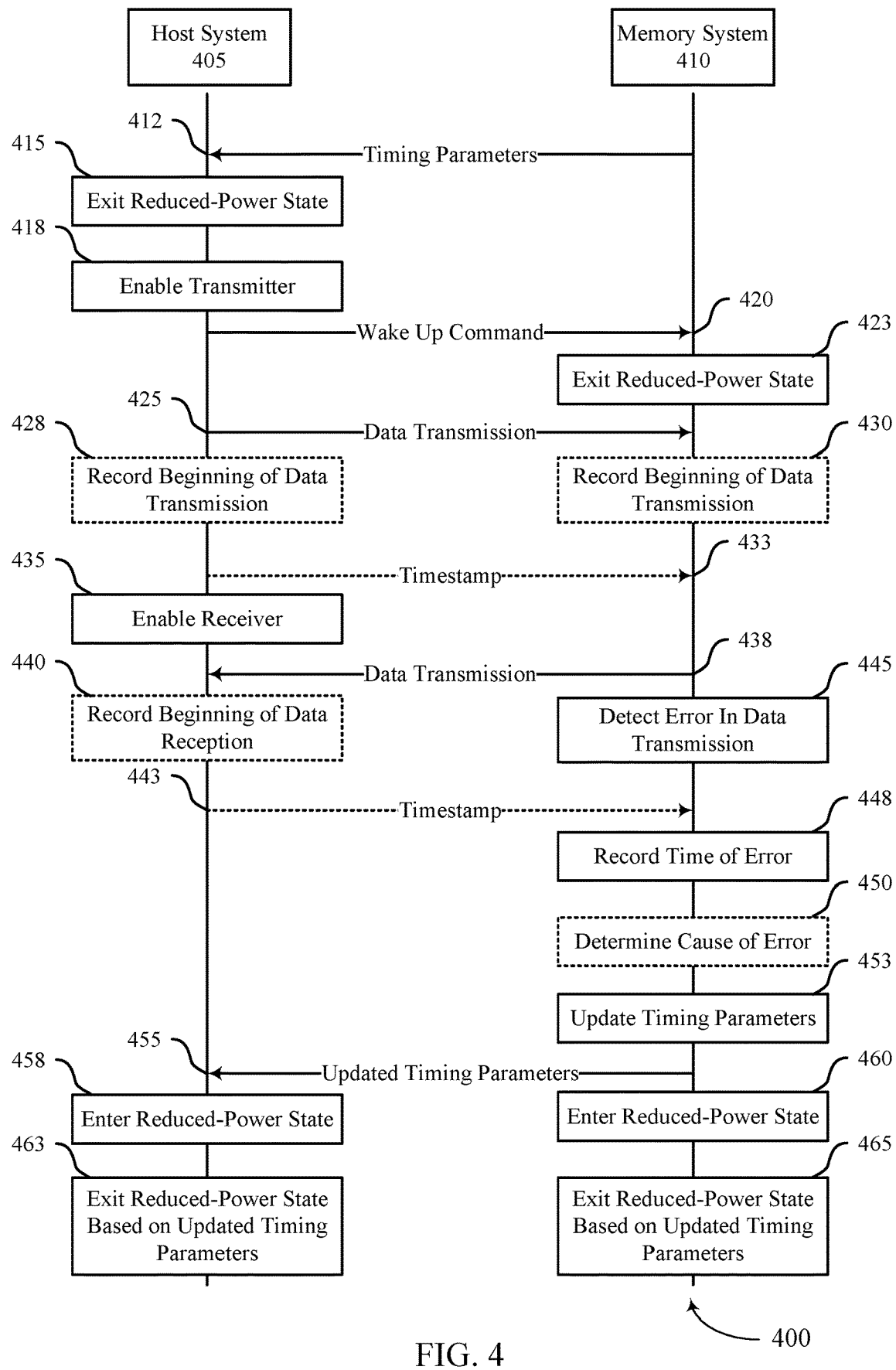
FIG. 4 illustrates an example of a set of operations for alignment of activation periods in accordance with examples as disclosed herein.

FIG. 4 illustrates an example of a set of operations for alignment of activation periods in accordance with examples as disclosed herein.

Process flow 400 may be performed by host system 405 and memory system 410, which may be respective examples of a host system and a memory system described herein. In some examples, process flow 400 illustrates an example set of operations performed to support alignment of activation periods. For example, process flow 400 may include operations for aligning a timing of an initial transmission by a host system after a memory system exits a reduced-power state with an enabling of a receiver at the host system.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller (e.g., the a host system controller of host system 405 or a memory system controller of memory system 410), may cause the controller to perform the operations of the process flow 400.

One or more of the operations described in process flow 400 may be performed earlier or later, omitted, replaced, supplemented, or combined with another operation. Also, additional operations described herein may replace, supplement or be combined with one or more of the operations described in process flow 400.

At 412, timing parameters associated with exiting a reduced-power state may be obtained. Host system 405 may receive the timing parameters from memory system 410. In some examples, memory system 410 may transmit the timing parameters to host system 405 during an initialization procedure or in response to a request from host system 405. Values for the timing parameters may be configured at memory system 410 pre-deployment or during operation (e.g., by a controller in memory system 410).

At 415, a reduced-power state of host system 405 may be exited. Host system 405 may exit the reduced-power state based on obtaining data for storage in memory system 410. While in the reduced-power state, host system 405 may operate a transmitter and receiver for communicating with memory system 410 (among other components) in a low power state. In some examples, host system 405 may turn off the transmitter and receiver. Host system 405 may also apply a zero voltage state to a connection between a transmitter of host system 405 and a receiver of memory system 410.

As part of exiting the reduced-power state, host system 405 may observe a set of durations that are based on the timing parameters received from memory system 410 and may perform certain operations (e.g., enabling certain components) at certain milestones based on those durations. For example, before configuring a transmitter in a normal power state, host system 405 may observe a hibernation duration and a first activation duration—e.g., to give the memory system 410 time to enable its receiver.

At 418, a transmitter at host system 405 may be enabled (e.g., by a controller at host system 405). Enabling the transmitter may include transitioning the transmitter to a normal power state, turning on the transmitter, or both. Once the transmitter at host system 405 is activated, host system 405 may be considered as being in a transmission-ready state.

At 420, a wake-up command may be transmitted to memory system 410. Host system 405 may transmit the wake-up command to memory system 410 based on the transmitter being enabled. In response to receiving the wake-up command, memory system 410 may transmit a wake-up command to host system 405—e.g., to activate a receiver at host system 405.

At 423, a reduced-power state of memory system 410 may be exited. Memory system 410 may exit the reduced-power state based on obtaining a wake up command from host system 405. While in the reduced-power state, memory system 410 may operate a transmitter and a receiver for communicating with host system 405 (among other components) in a lower power state. In some examples, memory system 410 may turn off the transmitter. Memory system 410 may also apply a zero voltage state to a connection between a transmitter of memory system 410 and a receiver of host system 405.

Memory system 410 may exit the reduced-power state in accordance with a set of durations that are based on the timing parameters configured at memory system 410. For example, memory system 410 may exit the reduced-power within a hibernation duration and may activate a receiver within a first activation duration. Once the receiver at memory system 410 is activated, memory system 410 may be considered as being in a reception-ready state.

At 425, data may be transmitted to memory system 410. Host system 405 may transmit data to memory system 410 at an end of a combined duration that includes a hibernation duration (which may be referred to as $T_{hib}$) and a first activation duration (which may be referred to as $T_{act\_1}$).

At 428 and 430, a beginning of the data transmission may be recorded (e.g., by one or both of host system 405 and memory system 410. Recording the beginning of the data transmission may include generating a timestamp. The timestamp may be generated based on a timing of a real time clock that maintains an absolute or relative timing throughout an operation of host system 405 and memory system 410.

At 433, the timestamp may be transmitted to memory system 410 (e.g., from host system 405).

At 435, a receiver at host system 405 may be enabled. Host system 405 may enable the receiver at an end of a combined duration that includes a delay period relative to the combined duration for enabling the transmitter. That is, relative to enabling the transmitter, host system 405 may enable the receiver after a combined duration including the delay period, the hibernation duration, and a second activation duration (which may be referred to as $T_{act\_2}$) elapses. Once the receiver at host system 405 is activated, host system 405 may be considered as being in a reception-ready state.

In some examples, host system 405 enables the receiver based on receiving a wake-up command from memory system 410. Memory system 410 may transmit the wake-up command to receiver based on obtaining information to send to host system 405 (e.g., system information) or based on receiving a read command from host system 405. Memory system 410 may observe the combined duration including the delay period, the hibernation duration, and a second activation duration before transmitting data to host system 405—e.g., to give the host system 405 time to enable its receiver. In some examples, the duration for enabling the receiver at host system 405 may correspond to a duration for enabling a transmitter at memory system 410 when exiting the reduced-power state. Once the transmitter at memory system 410 is activated, memory system 410 may be considered as being in a transmission-ready state.

As described herein, the receiver may be enabled while the data transmission to memory system 410 is ongoing. In some examples, enabling the receiver may interfere with the data transmission, introducing one or more errors into the data transmission.

At 438, data may be transmitted to host system 405. Memory system 410 may transmit data to host system 405 at an end of the combined duration that includes the delay period, the hibernation duration, and the second activation duration.

At 440, a beginning of the data reception may be recorded. Host system 405 may record a time at which the data transmission from memory system 410 is received. In some examples, host system 405 may generate a timestamp using a timing of the real time clock that indicates the beginning of the data reception. At 443, the timestamp may be transmitted to memory system 410.

At 445, an error in the data transmission received from host system 405 may be detected. Memory system 410 may decode the data transmission received from host system 405. Error management circuitry (e.g., an ECC circuit, a CRC circuit, etc.) at memory system 410 may detect the error in the data transmission.

At 448, a time of the error may be recorded. Memory system 410 may record the time of the error based on the error detection operation. In some examples, memory system 410 back calculates the time of the error based on the error detection operation. For example, memory system 410 may determine the time of the error based on determining a portion of the data transmission in which the error occurred and determining a time range for the portion of the data transmission. Additionally, or alternatively, memory system 410 may subtract a predetermined duration from the time the error was detected—e.g., based on an average duration for processing and detecting errors in received data.

Based on determining the time of the error, memory system 410 may generate a timestamp. In some examples, memory system 410 generates the timestamp based on the real time clock—e.g., based on synchronizing a clock at memory system 410 with the real time clock or based on a relative timing of the clock at memory system 410 and the real time clock. Accordingly, the timestamps recorded by memory system 410 may be compatible with the timestamps recorded by host system 405.

At 450, a cause of the error in the data may be determined. In some examples, memory system 410 may determine that the error was caused by enabling the receiver at host system 405 based on the timestamp. For example, memory system 410 may determine that the error was caused by enabling the receiver at host system 405 based on determining that the timestamp occurred within a threshold duration of the beginning of the data transmission performed by host system 405—e.g., based on the corresponding timestamp recorded at 430 and/or received at 433. Additionally, or alternatively, memory system 410 may determine that the error was caused by enabling the receiver at host system 405 based on determining that the timestamp occurred within a second threshold duration of enabling the receiver at host system 405—e.g., based on the timestamp indicating the beginning of data reception received from host system 405. The second threshold duration may be less than the first threshold duration.

At 453, the timing parameters associated with exiting the reduced-power state may be updated. Memory system 410 may update the timing parameters based on determining that the receiver at host system 405 being enabled caused the error in the data transmission received from host system 405. To update the timing parameters, memory system 410 may determine a difference between the timestamp indicating the beginning of the received data transmission and the timestamp indicating the occurrence of the error. Memory system 410 may further adjust a timing parameter associated with the second activation duration ($T_{act2}$) so that the duration indicated by the timing parameter includes the prior activation duration plus the determined difference between the two timestamps. That is, for subsequent exits from the reduced-power state, memory system 410 may increase the second activation duration by the difference between the two timestamps.

At 455, the updated timing parameters may be received at host system 405 (e.g., from memory system 410).

At 458 and 460, the reduced-power state may be reentered (e.g., by both of host system 405 and memory system 410).

At 463 and 465, the reduced-power state may again be exited (e.g., by both of host system 405 and memory system 410). Host system 405 and memory system 410 may exit the reduced-power state for the second time as similarly described above. However, host system 405 and memory system 410 may observe an updated length of the second activation duration. Accordingly, the beginning of a data transmission from host system 405 may be more closely aligned with an enabling of the receiver at host system 405. Memory system 410 may similarly monitor the received data transmission for errors. If an error is again detected and determined as being caused by the receiver at host system 405 being enabled, memory system 410 may again update the timing parameters as described above—e.g., to refine the alignment. Otherwise, host system 405 and memory system 410 may maintain and use the updated timing parameters for subsequent exits from the reduced-power state.

Figure 5:
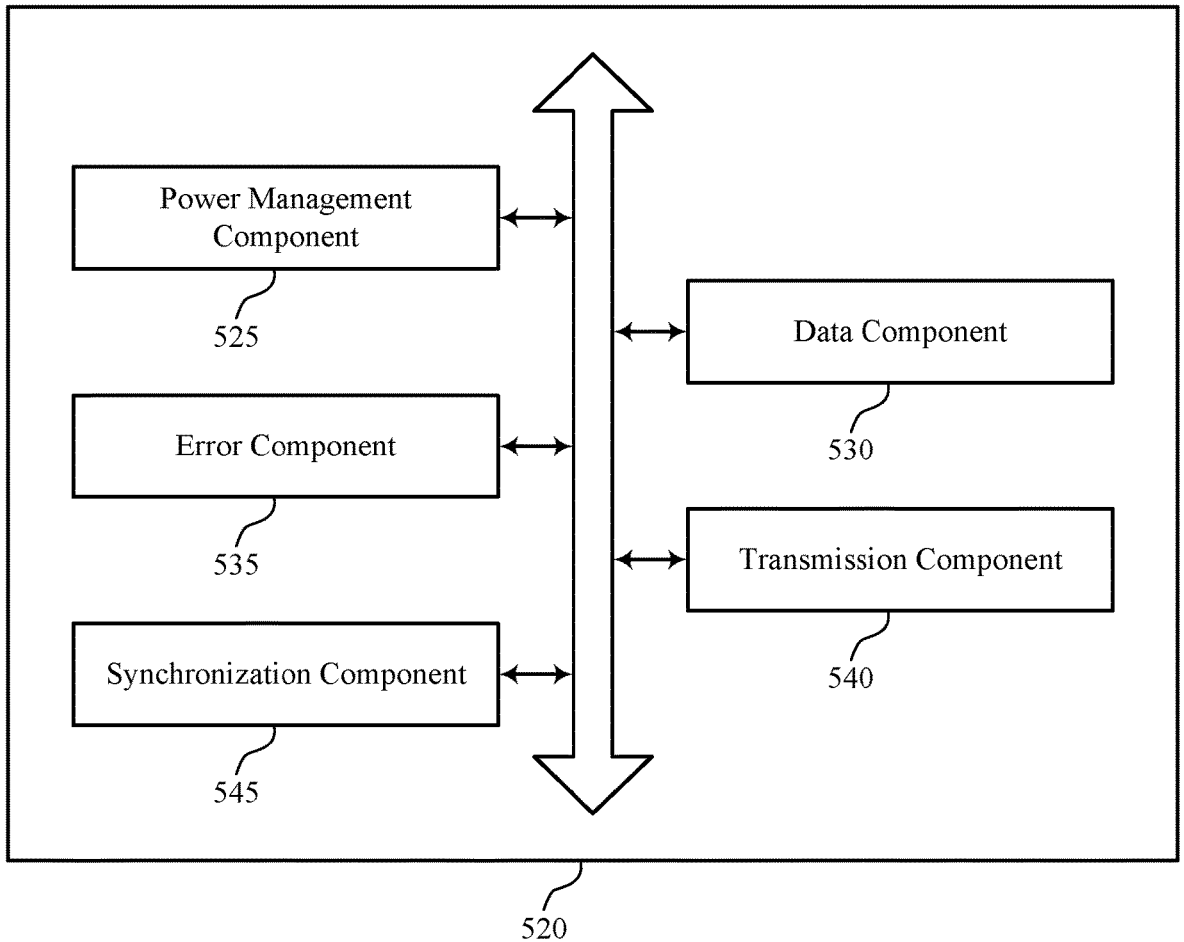
FIG. 5 shows a block diagram of a memory system that supports alignment of activation periods in accordance with examples as disclosed herein.

FIG. 5 shows a block diagram 500 of a memory system 520 that supports alignment of activation periods in accordance with examples as disclosed herein. The memory system 520 may be an example of aspects of a memory system as described with reference to FIGS. 1 through 4. The memory system 520, or various components thereof, may be an example of means for performing various aspects of alignment of activation periods as described herein. For example, the memory system 520 may include a power management component 525, a data component 530, an error component 535, a transmission component 540, a synchronization component 545, or any combination thereof. Each of these components may communicate, directly or indirectly, with one another (e.g., via one or more buses).

The power management component 525 may be configured as or otherwise support a means for transitioning from a reduced-power state to a reception-ready state, where a timing parameter indicates a first duration for transitioning from the reduced-power state to the reception-ready state. The data component 530 may be configured as or otherwise support a means for receiving, beginning at a first time that is based at least in part on the first duration after transitioning from the reduced-power state, a transmission of data from a host system. The error component 535 may be configured as or otherwise support a means for determining a second time associated with an error in the data of the transmission, the second time occurring after the first time. In some examples, the power management component 525 may be configured as or otherwise support a means for configuring, based at least in part on a difference between the second time and the first time, the timing parameter to indicate a second duration for transitioning from the reduced-power state to the reception-ready state, the second duration being longer than the first duration.

In some examples, the power management component 525 may be configured as or otherwise support a means for reentering, after configuring the timing parameter to indicate the second duration, the reduced-power state. In some examples, the power management component 525 may be configured as or otherwise support a means for transitioning, after reentering the reduced-power state, from the reduced-power state to the reception-ready state. In some examples, the data component 530 may be configured as or otherwise support a means for receiving, beginning at a third time that is based at least in part on the second duration and transitioning to the reception-ready state after the reduced-power state is reentered, a second transmission from the host system. In some examples, the transmission component 540 may be configured as or otherwise support a means for performing, a third transmission to the host system beginning at a fourth time, where the fourth time is within a threshold duration of the third time based at least in part on the timing parameter indicating the second duration.

In some examples, the power management component 525 may be configured as or otherwise support a means for applying an offset to the second duration to obtain a third duration that is less than the second duration. In some examples, the power management component 525 may be configured as or otherwise support a means for configuring, based at least in part on transitioning to the reception-ready state after the reduced-power state is reentered, the timing parameter to indicate the third duration for transitioning from the reduced-power state to the reception-ready state based at least in part on the applying.

In some examples, the power management component 525 may be configured as or otherwise support a means for calculating the second duration based at least in part on adding the difference between the second time and the first time to the first duration.

In some examples, the synchronization component 545 may be configured as or otherwise support a means for synchronizing with a clock of the host system, where the first time and the second time are determined based at least in part on the clock.

In some examples, the synchronization component 545 may be configured as or otherwise support a means for receiving, from the host system, timing information based on the clock of the host system, where the timing information includes an absolute time reference or a relative time reference.

In some examples, the power management component 525 may be configured as or otherwise support a means for indicating the timing parameter to the host system based at least in part on configuring the timing parameter to indicate the second duration.

In some examples, the error component 535 may be configured as or otherwise support a means for applying an error detection operation to a set of data obtained from decoding the transmission. In some examples, the error component 535 may be configured as or otherwise support a means for detecting, based at least in part on applying the error detection operation, the error in the data of the transmission, where the second time associated with the error is determined based at least in part on detecting the error.

In some examples, a second timing parameter of indicates a third duration for transitioning from the reduced-power state to a transmission-ready state, and the transmission component 540 may be configured as or otherwise support a means for performing, beginning at a third time that is based at least in part on the third duration, a second transmission of data to the host system, where the error in the transmission is associated with the second transmission.

In some examples, the power management component 525 may be configured as or otherwise support a means for configuring the timing parameter for the second duration based at least in part on a difference between the second time and the third time being less than a threshold.

In some examples, the power management component 525 may be configured as or otherwise support a means for receiving, from the host system, an indication of the third time.

In some examples, the transmission component 540 may be configured as or otherwise support a means for applying, based at least in part on transitioning to the reception-ready state, a voltage to a first differential channel coupled with the host system until the third time, where a second differential channel coupled with the host system has the voltage until the first time.

In some examples, the power management component 525 may be configured as or otherwise support a means for receiving, from the host system at a receiver, a first command to transition to the reception-ready state at a fourth time that occurs before the first time. In some examples, the transmission component 540 may be configured as or otherwise support a means for transmit, to a receiver of the host system, a second command to exit the reduced-power state at a fifth time that occurs after the fourth time and before the first time.

In some examples, the second time occurs during the transmission and within a threshold duration of the first time.

In some examples, the transmission component 540 may be configured as or otherwise support a means for setting, while in the reduced-power state, a state of a differential channel coupled with the host system to a zero voltage state and disabling reception of the data from the host system over the differential channel.

In some examples, the power management component 525 may be configured as or otherwise support a means for enabling, while in the reception-ready state, reception of the data over a differential channel coupled with the host system.

Figure 6:
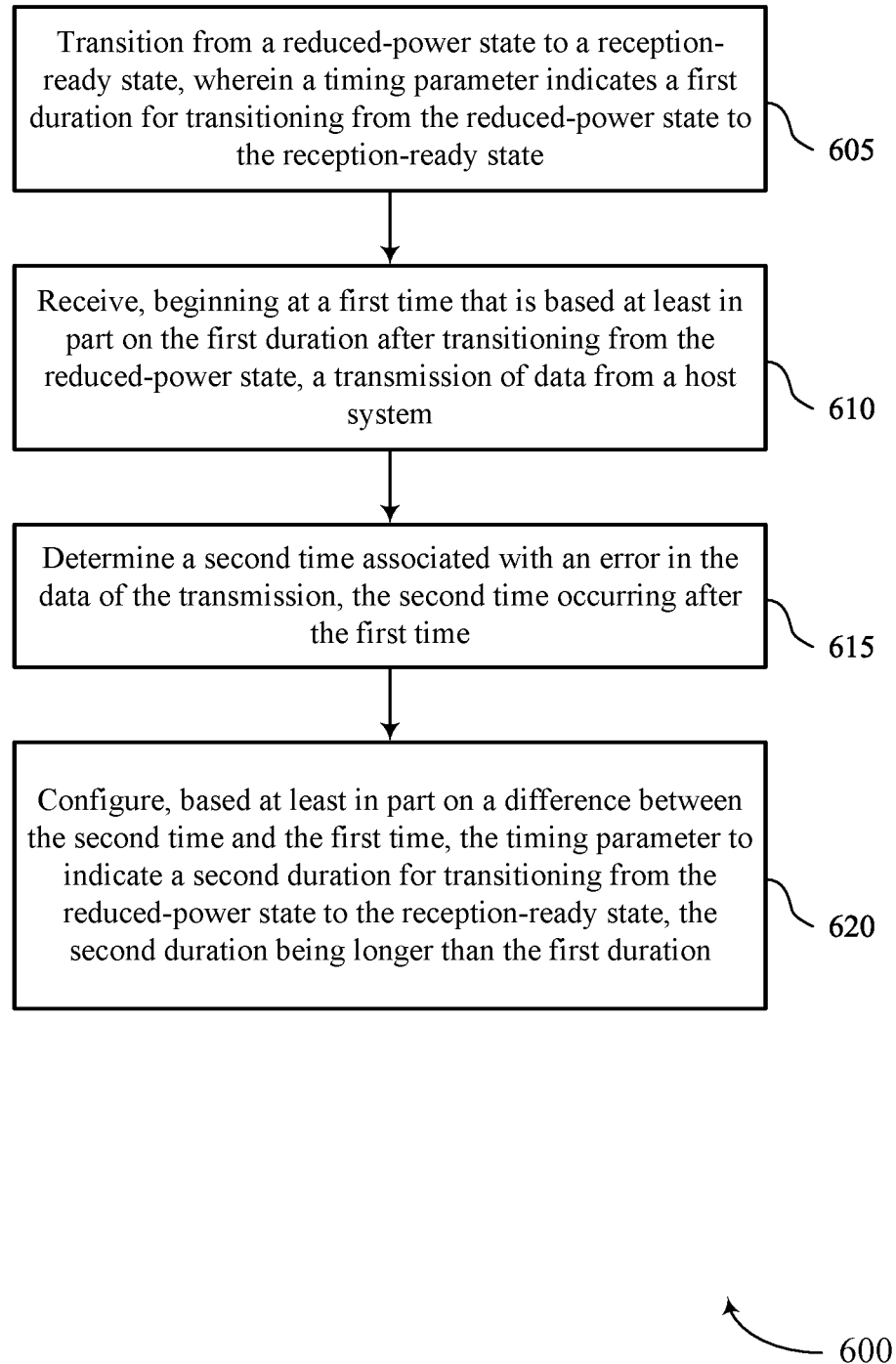
FIG. 6 shows a flowchart illustrating a method or methods that support alignment of activation periods in accordance with examples as disclosed herein.

FIG. 6 shows a flowchart illustrating a method 600 that supports alignment of activation periods in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include transitioning from a reduced-power state to a reception-ready state, where a timing parameter indicates a first duration for transitioning from the reduced-power state to the reception-ready state. The operations of 605 may be performed in accordance with examples as disclosed herein. In some examples, aspects of the operations of 605 may be performed by a power management component 525 as described with reference to FIG. 5.

At 610, the method may include receiving, beginning at a first time that is based at least in part on the first duration after transitioning from the reduced-power state, a transmission of data from a host system. The operations of 610 may be performed in accordance with examples as disclosed herein. In some examples, aspects of the operations of 610 may be performed by a data component 530 as described with reference to FIG. 5.

At 615, the method may include determining a second time associated with an error in the data of the transmission, the second time occurring after the first time. The operations of 615 may be performed in accordance with examples as disclosed herein. In some examples, aspects of the operations of 615 may be performed by an error component 535 as described with reference to FIG. 5.

At 620, the method may include configuring, based at least in part on a difference between the second time and the first time, the timing parameter to indicate a second duration for transitioning from the reduced-power state to the reception-ready state, the second duration being longer than the first duration. The operations of 620 may be performed in accordance with examples as disclosed herein. In some examples, aspects of the operations of 620 may be performed by a power management component 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transitioning from a reduced-power state to a reception-ready state, where a timing parameter indicates a first duration for transitioning from the reduced-power state to the reception-ready state; receiving, beginning at a first time that is based at least in part on the first duration after transitioning from the reduced-power state, a transmission of data from a host system; determining a second time associated with an error in the data of the transmission, the second time occurring after the first time; and configuring, based at least in part on a difference between the second time and the first time, the timing parameter to indicate a second duration for transitioning from the reduced-power state to the reception-ready state, the second duration being longer than the first duration.

Aspect 2: The method, apparatus, or non-transitory computer-readable medium of aspect 1, further including operations, features, circuitry, logic, means, or instructions, or any combination thereof for reentering, after configuring the timing parameter to indicate the second duration, the reduced-power state; transitioning, after reentering the reduced-power state, from the reduced-power state to the reception-ready state; receiving, beginning at a third time that is based at least in part on the second duration and transitioning to the reception-ready state after the reduced-power state is reentered, a second transmission from the host system; and performing, a third transmission to the host system beginning at a fourth time, where the fourth time is within a threshold duration of the third time based at least in part on the timing parameter indicating the second duration.

Aspect 3: The method, apparatus, or non-transitory computer-readable medium of aspect 2, further including operations, features, circuitry, logic, means, or instructions, or any combination thereof for applying an offset to the second duration to obtain a third duration that is less than the second duration and configuring, based at least in part on transitioning to the reception-ready state after the reduced-power state is reentered, the timing parameter to indicate the third duration for transitioning from the reduced-power state to the reception-ready state based at least in part on the applying.

Aspect 4: The method, apparatus, or non-transitory computer-readable medium of any of aspects 1 through 3, further including operations, features, circuitry, logic, means, or instructions, or any combination thereof for calculating the second duration based at least in part on adding the difference between the second time and the first time to the first duration.

Aspect 5: The method, apparatus, or non-transitory computer-readable medium of any of aspects 1 through 4, further including operations, features, circuitry, logic, means, or instructions, or any combination thereof for synchronizing with a clock of the host system, where the first time and the second time are determined based at least in part on the clock.

Aspect 6: The method, apparatus, or non-transitory computer-readable medium of aspect 5, further including operations, features, circuitry, logic, means, or instructions, or any combination thereof for receiving, from the host system, timing information based on the clock of the host system, where the timing information includes an absolute time reference or a relative time reference.

Aspect 7: The method, apparatus, or non-transitory computer-readable medium of any of aspects 1 through 6, further including operations, features, circuitry, logic, means, or instructions, or any combination thereof for indicating the timing parameter to the host system based at least in part on configuring the timing parameter to indicate the second duration.

Aspect 8: The method, apparatus, or non-transitory computer-readable medium of any of aspects 1 through 7, further including operations, features, circuitry, logic, means, or instructions, or any combination thereof for applying an error detection operation to a set of data obtained from decoding the transmission and detecting, based at least in part on applying the error detection operation, the error in the data of the transmission, where the second time associated with the error is determined based at least in part on detecting the error.

Aspect 9: The method, apparatus, or non-transitory computer-readable medium of any of aspects 1 through 8 where a second timing parameter of indicates a third duration for transitioning from the reduced-power state to a transmission-ready state and the method, apparatuses, and non-transitory computer-readable medium, further includes operations, features, circuitry, logic, means, or instructions, or any combination thereof for performing, beginning at a third time that is based at least in part on the third duration, a second transmission of data to the host system, where the error in the transmission is associated with the second transmission.

Aspect 10: The method, apparatus, or non-transitory computer-readable medium of aspect 9, further including operations, features, circuitry, logic, means, or instructions, or any combination thereof for configuring the timing parameter for the second duration based at least in part on a difference between the second time and the third time being less than a threshold.

Aspect 11: The method, apparatus, or non-transitory computer-readable medium of any of aspects 9 through 10, further including operations, features, circuitry, logic, means, or instructions, or any combination thereof for receiving, from the host system, an indication of the third time.

Aspect 12: The method, apparatus, or non-transitory computer-readable medium of any of aspects 9 through 11, further including operations, features, circuitry, logic, means, or instructions, or any combination thereof for applying, based at least in part on transitioning to the reception-ready state, a voltage to a first differential channel coupled with the host system until the third time, where a second differential channel coupled with the host system has the voltage until the first time.

Aspect 13: The method, apparatus, or non-transitory computer-readable medium of any of aspects 9 through 12, further including operations, features, circuitry, logic, means, or instructions, or any combination thereof for receiving, from the host system at a receiver, a first command to transition to the reception-ready state at a fourth time that occurs before the first time and transmit, to a receiver of the host system, a second command to exit the reduced-power state at a fifth time that occurs after the fourth time and before the first time.

Aspect 14: The method, apparatus, or non-transitory computer-readable medium of any of aspects 1 through 13 where the second time occurs during the transmission and within a threshold duration of the first time.

Aspect 15: The method, apparatus, or non-transitory computer-readable medium of any of aspects 1 through 14, further including operations, features, circuitry, logic, means, or instructions, or any combination thereof for setting, while in the reduced-power state, a state of a differential channel coupled with the host system to a zero voltage state and disabling reception of the data from the host system over the differential channel.

Aspect 16: The method, apparatus, or non-transitory computer-readable medium of any of aspects 1 through 15, further including operations, features, circuitry, logic, means, or instructions, or any combination thereof for enabling, while in the reception-ready state, reception of the data over a differential channel coupled with the host system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices; and
processing circuitry coupled with the one or more memory devices and configured to cause the apparatus to:
transition from a reduced-power state to a reception-ready state, wherein a timing parameter of the apparatus indicates a first duration for transitioning the apparatus from the reduced-power state to the reception-ready state;
receive, beginning at a first time that is based at least in part on the first duration after transitioning from the reduced-power state, a transmission of data from a host system;
determine a second time associated with an error in the data of the transmission, the second time occurring after the first time; and
configure, based at least in part on a difference between the second time and the first time, the timing parameter to indicate a second duration for transitioning the apparatus from the reduced-power state to the reception-ready state, the second duration being longer than the first duration.

2. The apparatus of claim 1, wherein the processing circuitry is further configured to cause the apparatus to:
reenter, after configuring the timing parameter to indicate the second duration, the reduced-power state;
transition, after reentering the reduced-power state, from the reduced-power state to the reception-ready state;
receive, beginning at a third time that is based at least in part on the second duration and transitioning to the reception-ready state after the reduced-power state is reentered, a second transmission from the host system; and
perform, a third transmission to the host system beginning at a fourth time, wherein the fourth time is within a threshold duration of the third time based at least in part on the timing parameter indicating the second duration.

3. The apparatus of claim 2, wherein the processing circuitry is further configured to cause the apparatus to:
apply an offset to the second duration to obtain a third duration that is less than the second duration; and
configure, based at least in part on transitioning to the reception-ready state after the reduced-power state is reentered, the timing parameter to indicate the third duration for transitioning the apparatus from the reduced-power state to the reception-ready state based at least in part on the applying.

4. The apparatus of claim 1, wherein the processing circuitry is further configured to cause the apparatus to:
calculate the second duration based at least in part on adding the difference between the second time and the first time to the first duration.

5. The apparatus of claim 1, further comprising:
a first clock that is synchronized to a second clock of the host system, wherein the first time and the second time are determined based at least in part on the first clock.

6. The apparatus of claim 5, wherein the processing circuitry is further configured to cause the apparatus to:
receive, from the host system, timing information based on the second clock of the host system, wherein the timing information comprises an absolute time reference or a relative time reference.

7. The apparatus of claim 1, wherein the processing circuitry is further configured to cause the apparatus to:
indicate the timing parameter to the host system based at least in part on configuring the timing parameter to indicate the second duration.

8. The apparatus of claim 1, wherein the processing circuitry is further configured to cause the apparatus to:
apply an error detection operation to a set of data obtained from decoding the transmission; and
detect, based at least in part on applying the error detection operation, the error in the data of the transmission, wherein the second time associated with the error is determined based at least in part on detecting the error.

9. The apparatus of claim 1, wherein a second timing parameter of the apparatus indicates a third duration for transitioning the apparatus from the reduced-power state to a transmission-ready state, and wherein the processing circuitry is further configured to cause the apparatus to:
perform, beginning at a third time that is based at least in part on the third duration, a second transmission of data to the host system, wherein the error in the transmission is associated with the second transmission.

10. The apparatus of claim 9, wherein the processing circuitry is further configured to cause the apparatus to:
configure the timing parameter for the second duration based at least in part on a difference between the second time and the third time being less than a threshold.

11. The apparatus of claim 9, wherein the processing circuitry is further configured to cause the apparatus to:
receive, from the host system, an indication of the third time.

12. The apparatus of claim 9, wherein the processing circuitry is further configured to cause the apparatus to:
apply, based at least in part on transitioning to the reception-ready state, a voltage to a first differential channel between the apparatus and the host system until the third time, wherein a second differential channel between the apparatus and the host system has the voltage until the first time.

13. The apparatus of claim 9, wherein the processing circuitry is further configured to cause the apparatus to:
receive, from the host system at a receiver of the apparatus, a first command to transition to the reception-ready state at a fourth time that occurs before the first time; and
transmit, to a receiver of the host system, a second command to exit the reduced-power state at a fifth time that occurs after the fourth time and before the first time.

14. The apparatus of claim 1, wherein the second time occurs during the transmission and within a threshold duration of the first time.

15. The apparatus of claim 1, wherein for the reduced-power state, the apparatus sets a state of a differential channel between the host system and the apparatus to a zero voltage state and disables reception of the data from the host system over the differential channel.

16. The apparatus of claim 1, wherein for the reception-ready state, the apparatus enables reception of the data over a differential channel between the host system and the apparatus.

17. A non-transitory, computer-readable medium storing code comprising instructions which, when executed by processing circuitry of an electronic device, cause the electronic device to:

transition from a reduced-power state to a reception-ready state, wherein a timing parameter of the electronic device indicates a first duration for transitioning the electronic device from the reduced-power state to the reception-ready state;

receive, beginning at a first time that is based at least in part on the first duration, a transmission of data from a host system;

determine a second time associated with an error in the data of the transmission, the second time occurring after the first time; and configure, based at least in part on a difference between the second time and the first time, the timing parameter to indicate a second duration for transitioning the electronic device from the reduced-power state to the reception-ready state, the second duration being longer than the first duration.

18. The non-transitory, computer-readable medium of claim 17, wherein the instructions, when executed by the processing circuitry of the electronic device, further cause the electronic device to:

reenter, after configuring the timing parameter to indicate the second duration, the reduced-power state;

transition, after reentering the reduced-power state, from the reduced-power state to the reception-ready state;

receive, beginning at a third time that is based at least in part on the second duration and transitioning to the reception-ready state after the reduced-power state is reentered, a second transmission from the host system; and perform, a third transmission to the host system beginning at a fourth time, wherein the fourth time is within a threshold duration of the third time based at least in part on the timing parameter indicating the second duration.

19. The non-transitory, computer-readable medium of claim 18, wherein the instructions, when executed by the processing circuitry of the electronic device, further cause the electronic device to:

apply an offset to the second duration to obtain a third duration that is less than the second duration; and configure, based at least in part on transitioning to the reception-ready state after the reduced-power state is reentered, the timing parameter to indicate the third duration for transitioning the electronic device from the reduced-power state to the reception-ready state based at least in part on the applying.

20. The non-transitory, computer-readable medium of claim 17, wherein the instructions, when executed by the processing circuitry of the electronic device, further cause the electronic device to:

calculate the second duration based at least in part on adding the difference between the second time and the first time to the first duration.

21. The non-transitory, computer-readable medium of claim 17, wherein the instructions, when executed by the processing circuitry of the electronic device, further cause the electronic device to:

indicate the timing parameter to the host system based at least in part on configuring the timing parameter to indicate the second duration.

22. The non-transitory, computer-readable medium of claim 17, wherein the instructions, when executed by the processing circuitry of the electronic device, further cause the electronic device to:

apply an error detection operation to a set of data obtained from decoding the transmission; and detect, based at least in part on applying the error detection operation, the error in the data of the transmission, wherein the second time associated with the error is determined based at least in part on detecting the error.

23. The non-transitory, computer-readable medium of claim 17, wherein a second timing parameter of the electronic device indicates a third duration for transitioning the electronic device from the reduced-power state to a transmission-ready state, and wherein the instructions, when executed by the processing circuitry of the electronic device, further cause the electronic device to:

perform, beginning at a third time that is based at least in part on the third duration, a second transmission of data to the host system, wherein the error in the transmission is associated with the second transmission.

24. A method, comprising:

transitioning from a reduced-power state to a reception-ready state, wherein a timing parameter of a memory system indicates a first duration for transitioning the memory system from the reduced-power state to the reception-ready state;

receiving, beginning at a first time that is based at least in part on the first duration, a transmission of data from a host system;

determining a second time associated with an error in the data of the transmission, the second time occurring after the first time; and configuring, based at least in part on a difference between the second time and the first time, the timing parameter to indicate a second duration for transitioning the memory system from the reduced-power state to the reception-ready state, the second duration being longer than the first duration.

25. The method of claim 24, further comprising:

reentering, after configuring the timing parameter to indicate the second duration, the reduced-power state;

transitioning, after reentering the reduced-power state, from the reduced-power state to the reception-ready state;

receiving, beginning at a third time that is based at least in part on the second duration and transitioning to the reception-ready state after the reduced-power state is reentered, a second transmission from the host system; and performing, a third transmission to the host system beginning at a fourth time, wherein the fourth time is within a threshold duration of the third time based at least in part on the timing parameter indicating the second duration.

* * * * *